March 8, 1932.  J. L. DRAKE  1,848,115
METHOD AND APPARATUS FOR PRODUCING SHEET GLASS
Filed Sept. 18, 1929
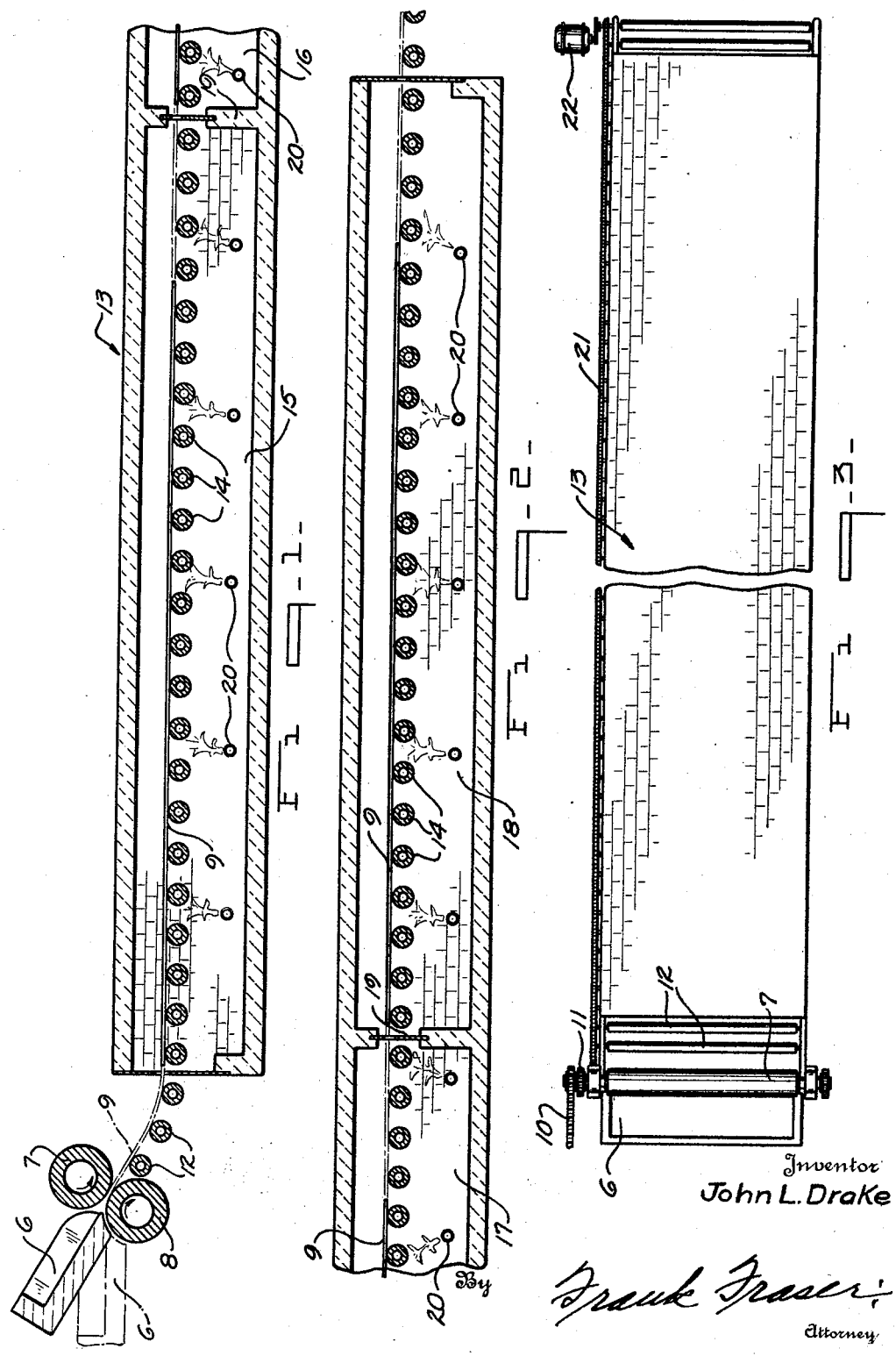
Inventor
John L. Drake
By Frank Fraser
Attorney Patented Mar. 8, 1932

1,848,115

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

METHOD AND APPARATUS FOR PRODUCING SHEET GLASS

Application filed September 18, 1929. Serial No. 393,458.

This invention relates broadly to the manufacture of sheet glass and more particularly to a method of and apparatus for forming sheet glass by an intermittent rolling operation.

In the manufacture of sheet glass according to one method, a plurality of successive sheets are intermittently rolled at predetermined intervals from a series of charges of molten glass. The molten glass is preferably melted and refined within suitable receptacles or pots and poured therefrom onto a receiver from where it is moved to and passed between a pair of forming rolls which function to reduce the glass to a sheet of substantially predetermined and uniform thickness. In the method just described, it is desirable that the molten glass passing to the forming rolls be rapidly reduced thereby to sheet form so as not to adversely affect the quality of the glass and also in order to speed up production. While it is expedient to reduce the molten glass rapidly to sheet form, it is not necessary that the glass be annealed while traveling at this same high rate of speed and in fact, such is undesirable for the reason that in this event, the annealing leer necessary would have to be exceedingly long. For example, if the glass were rolled to sheet form at the rate of sixty feet per minute and it required sixty minutes to anneal the glass, it will be seen that the length of leer necessary would be 3600 feet. The disadvantages incident to the construction, operation and maintenance of a leer of this length are believed to be obvious.

In its broad aspect, the present invention contemplates the provision of a method and apparatus whereby a mass of molten glass may be reduced to sheet form at a relatively high rate of speed by an intermittent rolling operation and the sheet subsequently annealed while traveling at a relatively slower speed. Thus, the invention aims to provide such a method and apparatus which will embody those advantages incident to the rapid reduction of the molten glass to sheet form and likewise those advantages which result from slower annealing of the glass.

Another object of the invention is the provision of such a method and apparatus whereby a plurality of successive sheets of glass are adapted to be formed at predetermined intervals and at a relatively high rate of speed, each sheet being carried forwardly as it is formed into and through the annealing leer, the speed of travel of the sheet through the leer being materially reduced during that interim between the formation of successive sheets while the speed of travel of said sheet is temporarily increased during the period of formation of each succeeding sheet. In this manner, the speed at which the sheet is caused to pass through the leer will be periodically varied and during the greater portion of the time required for annealing, the sheet will travel through the leer at a relatively slow speed.

Another object of the invention is the provision of such a method and apparatus of the above character wherein a more uniform cooling and annealing of the glass sheet may be had as the said sheet travels through the annealing leer to the end that the sheet will be cooled simultaneously the same amount throughout its entire area and the gradual reduction of the temperature of the sheet will be uniformly maintained so that the entire sheet will always be at substantially the same temperature.

A further object of the invention is the provision of an annealing leer of improved construction, divided or separated into a plurality of individual chambers each being maintained at a constant temperature and the sheet being caused to travel through each chamber at a relatively slow speed and transferred from one chamber to the adjacent chamber at a relatively higher speed, with the result that the sheet will be cooled and annealed uniformly and the forward end of the sheet will not be caused to cool in advance of the rear end. Such cooling and annealing of the sheet will reduce the formation of strains in the sheet and the tendency towards breakage of said sheet due to ununiform cooling and annealing to a minimum.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through apparatus constructed in accordance with the present invention, showing the forward end portion of the annealing leer, Fig. 2 is a similar view showing the rear or outlet end portion of the annealing leer, and Fig. 3 is a plan view of the apparatus.

Referring to the drawings, 6 designates a receiver or support adapted to receive thereupon a mass or charge of molten glass which is to be reduced to sheet form. This mass of molten glass is preferably deposited upon the receiver when the same is in a substantially horizontal position as indicated by the broken lines in Fig. 1 from a pot or receptacle (not shown) within which the glass is preferably completely melted and refined. Associated with one end of the receiver 6 are the sheet forming rolls 7 and 8 arranged relative to one another to create a sheet forming pass therebetween through which the molten glass is moved and reduced to a sheet 9 of substantially predetermined and uniform thickness. The receiver 6 and upper forming roll 7 are preferably mounted so that they are movable as a unit about the axis of rotation of the lower forming roll 8. Thus, after the molten glass has been deposited upon the receiver 6 while in a horizontal position, the said receiver may be tilted to the position indicated by the full lines to advance the glass downwardly between the forming rolls.

As pointed out above, it is desirable that the sheet of glass 9 be formed at a relatively high rate of speed and the rolls 7 and 8 are consequently rotated in a manner that their peripheral speed will be such that they will function to rapidly reduce the mass of molten glass to sheet form. One of the forming rolls 7 or 8 may be positively driven such as through suitable drive means 10 and the other forming roll driven from the positively driven roll through intermeshing gears 11 which are keyed to the shafts carrying the rolls. A plurality of rolls 12 may be positioned as indicated to receive the glass sheet 9 issuing from between the forming rolls and to guide the same downwardly and into the horizontal plane.

The numeral 13 designates an annealing leer containing a large number of horizontally aligned rolls 14 which are positioned to receive the glass sheet thereupon as it leaves the rolls 12. The annealing leer 13 is divided or separated into a plurality of individual compartments or chambers, the first two chambers at the entrance end of the leer adjacent the forming means being designated 15 and 16 and the two end chambers adjacent the exit end of said leer 17 and 18. While only four chambers have been shown, it is to be understood that any desired number of chambers may be interposed between the chambers 16 and 17 dependent upon the length of leer preferred. The adjacent chambers or compartments are separated from one another by a vertical partition wall 19 having a slot therein through which the sheet may pass from one compartment into the next compartment.

All of the leer rolls 14 and likewise the rolls 12 are adapted to be driven in unison at the same speed and to accomplish this, each of said rolls may have associated therewith a sprocket (not shown) about which is trained a sprocket chain 21 driven from a motor 22 or other source of power. The forming rolls 7 and 8 may also be driven in unison with the rolls 12 and 14 from the same drive or they may be driven independently of said rolls by a separate driving means as herein disclosed.

The various leer chambers are adapted to be of gradually decreasing temperatures from the intake end of the leer to the outlet or exit end thereof and the temperature in each chamber may be controlled in any suitable manner such as by the use of burners or the like 20. By way of example only, the temperature of the first chamber 15 adjacent the forming mechanism may be maintained at 1050 degrees Fahr., the next chamber 16 at 1000 degrees Fahr. and so on, with the last chamber 18 at the outlet end being 160 degrees Fahr., and the adjacent chamber 175 degrees Fahr. Thus, a sufficient number of chambers are adapted to be provided in order that the temperature in the succeeding chambers can be gradually decreased the desired number of degrees from the maximum temperature in chamber 15 to the minimum temperature in chamber 18. The temperature in any one chamber is adapted to be maintained separate and independently of the temperature in the remaining chambers and is also adapted to be held constant throughout the entire length thereof.

In the operation of the apparatus above described, the conveying rolls 12 and leer rolls 14 are adapted to be driven in unison intermittently at different but corresponding speeds. That is, during the reduction of the mass of molten glass to sheet form, the forming rolls 7 and 8 are adapted to be driven at a relatively high rate of speed to rapidly reduce the molten glass to sheet form and the conveying rolls 12 and leer rolls 14 are likewise driven at the same speed so that as the sheet is formed and deposited upon the latter rolls, it will be carried forwardly at a speed equal to the speed of formation thereof. After the entire sheet has been deposited upon the rolls 14 within the first leer chamber 15, however, the speed of the rolls 12 and 14 is materially reduced so that the sheet will be carried forwardly at a relatively slower speed. This reduced speed is continued during the interim which elapses between the completion of one sheet and the rolling of the next succeeding sheet. However, upon the formation of a second sheet, the speed of the rolls 12 and 14 is again increased or speeded up to receive the sheet. In this manner, the speed of the conveying rolls and leer rolls is relatively high during the formation of each sheet and relatively slower during the interim between the formation of successive sheets. The sheets are therefore caused to travel through the leer intermittently first at a relatively high rate of speed and then at a relatively slower rate of speed. In the event the drive for the forming rolls is coupled up with the drive for rolls 12 and 14, the forming rolls will always travel at the same speed as the said rolls 12 and 14.

To explain more fully, and by way of example only, let us assume that each sheet of glass is rolled or formed at the rate of sixty feet per minute. Therefore, during the formation of the sheet the forming rolls, conveying and leer rolls are all operated so that their surfaces will move at the rate of sixty feet per minute. After the entire sheet is supported upon the leer rolls 14 in chamber 15, the speed of the conveying and leer rolls is simultaneously reduced to say two feet per minute and the sheet carried forwardly through the leer at this reduced speed until it is desired to form another sheet. During the formation of the second sheet, however, the speed of the conveying and leer rolls is again increased to sixty feet per minute so that the already formed sheet will be carried through the leer at the rate of sixty feet per minute so long as the second sheet is being formed or, in other words, for one minute. After the second sheet is completed and received within the leer, the speed of travel of the sheets being carried forwardly is again reduced until it is desired to form a third sheet whereupon the above cycle of operations is repeated. Thus, the sheet is formed at a relatively high rate of speed and subsequently annealed while traveling first at a relatively slow speed and then at a relatively high speed.

It will be apparent, that in the event the sheet was formed at the rate of sixty feet per minute and it took sixty minutes to anneal the glass and the sheet was passed through the leer at a speed equal to the speed of formation thereof, the length of the leer necessary would have to be 3600 feet. According to the present invention, however, the length of leer necessary to properly anneal the glass may be materially reduced and brought to within a more practical and desirable length. For instance, let us assume that with the apparatus disclosed, one sheet of glass is adapted to be rolled or formed every seven minutes. The sheet is formed at the rate of sixty feet per minute and during this minute the forming rolls 7 and 8, conveying and leer rolls 12 and 14 respectively together with any sheets which may be supported upon the latter, will be traveling at this high rate of speed. As soon as the sheet is received within the leer, however, such speed is reduced to two feet per minute and this speed of two feet per minute is maintained for the next succeeding six minutes. The sheet will therefore travel seventy-two feet in seven minutes with an average speed of ten feet per minute through the annealing leer. Therefore, if sixty minutes be required to anneal the glass and the glass travels through the leer at an average speed of ten feet per minute, the leer would be approximately 600 feet long, which is not an impractical or undesirable length. In this manner, the sheet is kept constantly in motion at all times to prevent sagging thereof and a continuous annealing operation is had. While, after the sheet is formed and passed into the leer, it is at intervals caused to travel at a speed equal to the speed of formation, yet the sheet is annealed while traveling at an average speed much slower than the speed of formation thereof so that it may be accurately stated that the sheet is formed at a relatively high speed and subsequently annealed while traveling at a relatively slower speed.

In tunnel leers of the general character herein disclosed, there is usually provided a single continuous chamber extending throughout the length of the leer, said chamber having a gradually decreasing temperature from the intake end to the outlet end thereof. As a consequence, with leers of this type, the forward end of the glass sheet passing therethrough will be cooled in advance of the rear end thereof. This is an undesirable condition and causes the setting up of strains in the glass with resulting breakage.

As described hereinabove, the leer 13 of the present invention is divided transversely into a plurality of individual chambers, each being maintained at a constant uniform temperature and the temperature in each succeeding chamber being relatively less than the temperature in the preceding chamber. The individual leer chambers are each adapted to be of such a length that during one complete sheet forming cycle which, as above noted, is seven minutes, the sheet will pass entirely through any one chamber to bring the head or forward end of the sheet closely adjacent the partition wall 19 separating that chamber from the next succeeding chamber. More specifically, if a glass sheet sixty feet in length is rolled every seven minutes and it takes one minute to roll the sheet at the high rate of speed and six minutes in which the sheet is traveling at the relatively slower annealing speed, it will be seen that the sheet will travel at the rate of 72 feet in the seven minutes, so that each chamber should be 72 feet in length.

In carrying the invention into practice, the glass sheet will be reduced to sheet form within one minute and will pass into the first leer chamber 15 at this speed. As soon as the sheet is entirely received within the chamber, the speed of said sheet is materially reduced and the sheet caused to travel forwardly at the rate of approximately two feet per minute for the next six minutes which will bring the forward end of the sheet closely adjacent the partition 19 separating chamber 15 from chamber 16. A second sheet is then formed and during the formation of the second sheet, the leer rolls 14 are speeded up to the speed of sheet formation whereupon the first sheet within chamber 15 will be quickly transferred therefrom into chamber 16. As soon as the second sheet is received within chamber 15, the speed of the leer rolls is reduced so that the first sheet will move slowly through chamber 16 while the second sheet moves slowly through chamber 15. During the formation of each succeeding sheet, the leer rolls are temporarily speeded up to quickly transfer the sheets passing through the annealing leer from one chamber to the next chamber, and during that interim between the formation of each succeeding sheet, the glass sheets within the leer will pass through their respective chambers at a relatively slow speed. In this manner, each sheet will be uniformly cooled through out its entire area as it passes through the successive leer chambers, and since the sheet is quickly transferred from one chamber to another, there will be little or no danger of the forward end of the sheet cooling in advance of the rear end. Therefore, the process herein provided will not only permit the rapid formation of the sheet and the subsequent slower annealing thereof, but will further facilitate and improve the annealing of the sheet in such a manner as to reduce the formation of strains in the glass and consequent breakage thereof.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The method of producing sheet glass, which consists in forming the sheet at a relatively predetermined speed, carrying the sheet forwardly as it is formed at a speed substantially equal to the speed of formation thereof, annealing the sheet, intermittently decreasing and then increasing the speed of travel of the sheet at predetermined intervals during the annealing thereof, and in maintaining a constant, uniform temperature around the sheet during the time it is traveling at its slow speed.

2. The method of producing sheet glass, which consists in forming the sheet at a relatively predetermined speed, carrying the sheet forwardly as it is formed at a speed substantially equal to the speed of formation thereof, annealing the sheet, intermittently decreasing and then increasing the speed of travel of the sheet at predetermined intervals during the annealing thereof, and in carrying the sheet during the slow period of its travel through an annealing zone having a constant uniform temperature throughout.

3. The method of producing sheet glass, which consists in forming the sheet at a relatively predetermined speed, carrying the sheet forwardly as it is formed at a speed substantially equal to the speed of formation thereof, annealing the sheet, intermittently decreasing and then increasing the speed of travel of the sheet at predetermined intervals during the annealing thereof, in passing the sheet progressively through a plurality of annealing zones, and in maintaining a constant uniform temperature in each zone with the temperature in each succeeding zone being less than that of the preceding zone.

4. The method of producing sheet glass, which consists in forming the sheet at a relatively predetermined speed, carrying the sheet forwardly as it is formed at a speed substantially equal to the speed of formation thereof, annealing the sheet, intermittently decreasing and then increasing the speed of travel of the sheet at predetermined intervals during the annealing thereof, and in passing the sheet through a plurality of annealing zones, the sheet traveling through the zones at a relatively slow speed and being transferred from one zone to another zone at a relatively faster speed.

5. The method of producing sheet glass, which consists in forming the sheet at a relatively predetermined speed, carrying the sheet forwardly as it is formed at a speed substantially equal to the speed of formation thereof, annealing the sheet by passing it through a plurality of annealing zones, in maintaining the travel of the sheet through each zone at a relatively slow speed, and in speeding up the movement of the sheet during its transfer from one zone into the next zone.

6. The method of producing sheet glass, which consists in forming a plurality of successive sheets of glass at predetermined intervals and at a relatively high rate of speed, passing each sheet as it is formed into and through a series of annealing chambers, reducing the speed of travel of the sheet during that interval between the formation of successive sheets to pass said sheet slowly through the annealing chambers, and then increasing the speed of travel of the sheet during the formation of each succeeding sheet to quickly transfer the sheet from one chamber into the next chamber.

7. The method of producing sheet glass, which consists in forming a plurality of successive sheets of glass at predetermined intervals and at a relatively high rate of speed, passing each sheet as it is formed into and through a series of annealing chambers, reducing the speed of travel of the sheet during that interval between the formation of successive sheets to pass said sheet slowly through the annealing chambers, and in maintaining each chamber at a constant uniform temperature throughout with the succeeding chambers gradually decreasing in temperature.

8. In glass apparatus, sheet forming means, an annealing leer, means for dividing the leer transversely into a plurality of individual chambers, means for maintaining each chamber at a substantially constant uniform temperature throughout with the succeeding chambers gradually decreasing in temperature, means for receiving the sheet from the forming means and conveying it successively through said chambers, and means for driving said conveying means alternately at different speeds so as to carry the sheet through each chamber at a relatively slow speed and to transfer the sheet from one chamber into the next chamber at a relatively high speed.

Signed at Toledo, in the county of Lucas and State of Ohio, this 14th day of September, 1929.

JOHN L. DRAKE.